May 31, 1949.　　　　L. A. LARSON　　　　2,471,756
PORTABLE AND FOLDABLE VEHICLE LIFTING RAMP
Filed Jan. 27, 1947
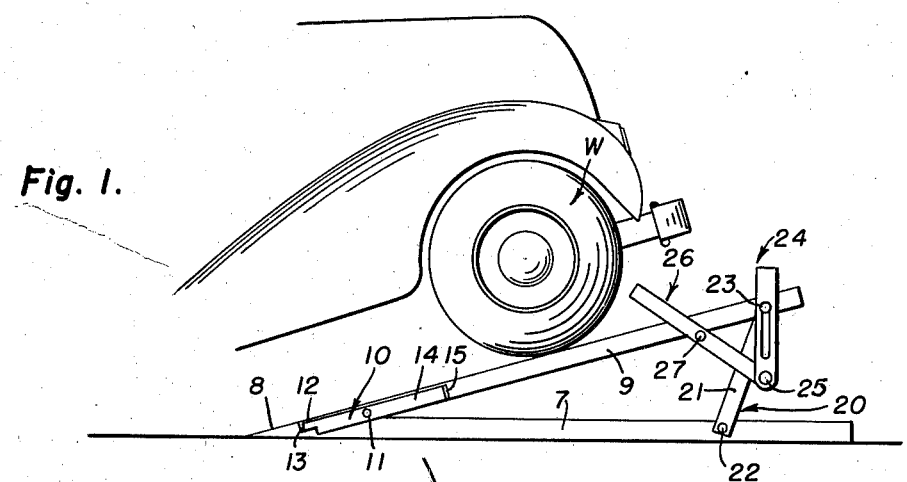
Fig. 1.
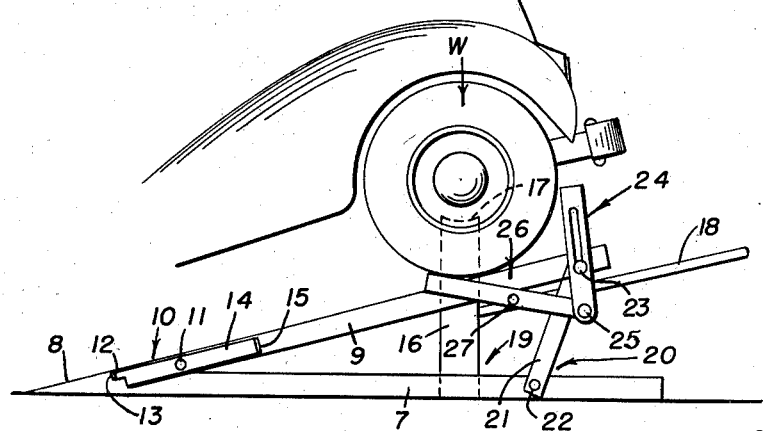
Fig. 2.
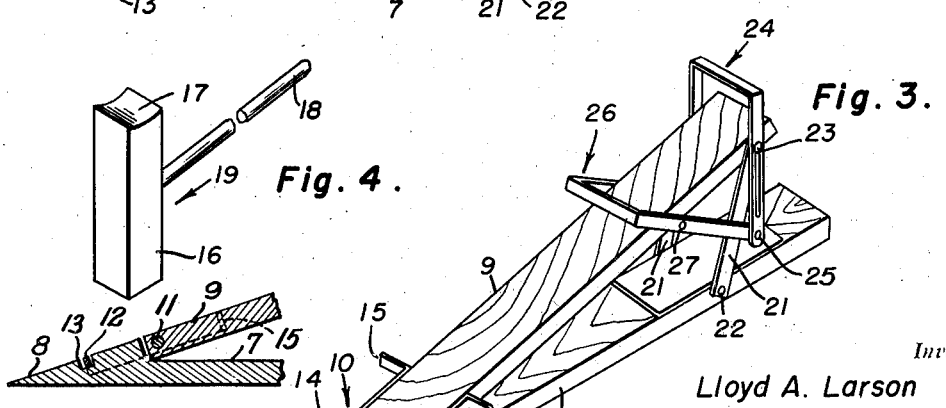
Fig. 3.
Fig. 4.
Fig. 5
Inventor
Lloyd A. Larson
By Clarence A. O'Brien
and Harvey B. Jacobson
Attorneys Patented May 31, 1949

2,471,756

UNITED STATES PATENT OFFICE 2,471,756

PORTABLE AND FOLDABLE VEHICLE LIFTING RAMP

Lloyd A. Larson, Oakland, Calif.

Application January 27, 1947, Serial No. 724,600

5 Claims. (Cl. 254—88)

This invention relates to automobile and similar vehicle lifting devices and has more particular reference to a vehicle and wheel lifting ramp of a portable and foldable type.

As the statement of the invention implies, I am conversant, generally speaking, with the state of development of the art to which the invention relates. Hence, with a view toward laying the ground work for the following description, I call attention to the fact that it is old in the art to provide a mechanically liftable and lowerable inclined runway or ramp which is attached to a horizontally disposable underlying base, and to provide means between the two for adjusting and hoisting the ramp, and at the proper time collapsing or dropping said ramp to permit the entire device to be removed to facilitate the step of demounting a wheel and complemental tire.

From the foregoing, it is evident, that in carrying out the principles of the present invention, a device has been adopted which, by structural and functional comparison with known prior art devices, is exceptionally simple in construction, is easy to set up, operate, and remove, is reliable and safe, compact and convenient, and otherwise satisfactory is aptly fulfilling the desired results.

A further object, in terms of generalities, is to improve upon and reduce the number of parts entering into the combination, thereby not only increasing the efficiency of the structure as a whole, but rendering same less costly to manufacture and to in this manner simplify factors of assembling, sale and use.

In structures of the type herein under advisement, it has been found necessary to employ, in conjunction with the ramp device, a separate pedestal, regular lifting jack, block or the like, the latter being placed, by hand, between a surface and the car axle to elevate and support the car axle and wheel and to permit the complemental ramp device to be bodily removed, this to permit access to be had during the steps of removing the wheel and replacing it with one carrying a fresh and properly usable tire. It follows, therefore, that it is another object of the invention to provide a ramp device or structure which permits a simple handle equipped block to be employed as a holding jack, the ramp means having an arrangement of collapsible or folding parts, these being latch controlled so as to permit the folding step to be readily accomplished and to also maintain desired compactness for convenient storage and carriage in one's automobile trunk.

Other objects, features and advantages of the invention will become more readily apparent from the following description and the accompanying illustrative drawings.

In the drawings, wherein like numerals are employed to designate like parts throughout the views:

Figure 1 is a side elevational view of the portable, foldable vehicle lifting ramp equipped device as constructed in accordance with the present invention and showing a fragmentary portion of an automobile or equivalent vehicle;

Figure 2 is a side elevational view based on Figure 1 showing the mechanism completely tripped in a manner to stop the forward and upward movement of the vehicle and including a showing of the aforementioned insertable and removable car axle-engaging block;

Figure 3 is a perspective view of the structure seen in Figures 1 and 2;

Figure 4 is a perspective view of the handle equipped block which supports the vehicle after the ramp device has been cleared away;

Figure 5 is an enlarged fragmentary sectional view showing how the left-hand portions of the baseboard and plank are constructed and separably connected together.

Referring now to the drawings by distinguishing reference numerals, it will be seen that the aforementioned baseboard 7 is usually an ordinary piece of timber, of appropriate dimensions, the same having its intake or left-hand end tapered outwardly and downwardly as at 8 to facilitate the step of feeding the vehicle wheel W onto the corresponding intake end of a complemental superposed plank 9. In this connection, and although I refer to the structure as a whole as a ramp, it is understood that, specifically, the inclined plank 9 is, in actual practice, the ramp proper and is provided at its left-hand or intake end with a bail-like trip latch 10 which bounds the edge portions in the manner shown and is pivoted as at 11. The connective or bight portion 12 functions as a detent or latch and is releasably engageable in a keeper kerf 13 formed transversely across the co-acting end portion of the base-board 7.

The aforementioned axle engaging vehicle sustaining block is denoted by the numeral 16, this being of appropriate material and proportions, having an axle seat 17 in the top and an applying and removing handle 18 on one side. This block means is generally denoted by the numeral 19 and is usable in a well known manner.

Referring now to the trip and check mechanism at the right-hand end portion of the boards 7 and 9, the prop and assembling means, generally visualized, is denoted by the numeral 20. More specifically, this comprises a pair of complemental links 21 pivotally connected at their lower ends as at 22 and pivotally connected at their upper ends as at 23. These links allow the two boards 7 and 9 to be folded down and into compact form as clear from Figures 1 to 3.

A U-shaped wheel stop and check yoke is denoted by the numeral 24 and has its arm portions provided with rectilinearly straight slots which slots are slidably and rockably mounted on the pivot and connecting pins 23. The lower ends of the slotted limbs are hingedly connected as at 25 with ends of adjacent limbs on the trip or trigger yoke 26. The limbs of the latter are also hingedly mounted at 27 on the plank 9.

In practice, it is to be assumed that the linkage and dual acting yoke means function, normally, as shown in Figure 1. Here, the bight portions of the yokes transversely span the traction surface of the ramp plank 9. As the vehicle wheel W rolls forwardly and upwardly on the ramp it will strike the trip yoke 26 and press same down and then the wheel will roll over it, as shown in Figure 2. The action of the trip yoke 26 therefore, serves to lift the check yoke 24 so that the latter takes a wheel stopping position as shown in Figure 2. It follows, therefore, that the mechanism, comprising linkage and yoke means, is substantially automatic in operation.

In practice, when the device is set up as shown in Figures 1 and 2, the vehicle, under its own power, is driven up the ramp with the wheel taking the position shown in Figure 1. The brakes of the vehicle hold the same in a position thus elevated until the block 16 is placed beneath the wheel axle. The reach handle 18 is sufficiently long to permit one to reach beneath the car and set the block directly beneath the axle. Then, the ramp construction is collapsed or folded down, whereupon the car axle rests in the seat 17. Now, with the ramp means completely out-of-the-way, the vehicle wheel may be removed and replaced with one equipped with a ready-to-use tire. These types of ramps and blocks and jacks are generally well known and hence, a particularizing description is, evidently, not essential here.

When the device is set up for use, as shown in the various figures of the drawings, the ramp 9 is obviously inclined in relation to the horizontal underlying baseboard 7. Also, as previously mentioned, the bight portion 12 of the latch bail 10 sits down in a keeper notch or kerf which is formed in the intake end portion 8 of the baseboard. Thus, the ramp is temporarily latched by way of said latch-bail, to the baseboard. Now when the ramp has served its purposes and the jack block 19 is put in position, as seen in Figure 2 and the ramp structure is to be removed from beneath the tire, the user simply steps on one of the outstanding fingers 15 and this lifts and releases the bight portion 12 from the keeper notch 13 and separates the boards 7 and 9 and allows same to then fold into compact overlapping relationship for convenience of storage, handling and other requirements.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A portable, foldable vehicle ramp structure comprising a base-board, a plank forming a ramp, said plank being disposed in superposed position above the base-board, prop means foldably connecting one end portion of said plank to a corresponding end portion of said baseboard a bail-like member pivotally mounted on the opposite end portion of said plank, said baseboard being provided with a tranverse kerf forming a keeper, the bight portion of said bail-like member constituting a detent and being releasably seatable in said keeper.

2. The structure specified in claim 1, the arms of said bail-like member having their free ends bent laterally and outwardly to form foot-pieces.

3. In a ramp-equipped device of the class described, a horizontal baseboard, a ramp having a releasable latch operatively and separably connectible at one end with said baseboard, links pivotally and foldably connecting corresponding opposite end portions of said baseboard and ramp, and a yoke of inverted U-shaped form, said yoke straddling the last-named end portion of the ramp, the arms of said yoke being slotted and said slotted arms being connected with the last-named pivotal connecion between the links and ramp, and a second U-shaped yoke, the intermediate portions of the limbs thereof being hingedly connected to said ramp, the bight portion spanning transversely the traction surface of the ramp, the free ends of the limbs of said second-named yoke being hingedly connected to the free ends of the limbs of the first-named yoke.

4. A portable, foldable vehicle ramp construction comprising a baseboard adapted to rest horizontally on a fixed supporting surface, a plank, constituting a ramp, disposed in superposed position above the baseboard, a bail-like member pivotally mounted on one end portion of said plank, said baseboard being provided with a transverse kerf forming a keeper, the bight portion of said bail-like member constituting a detent and being releasably seatable in said keeper, the arms of said bail-like member having their free ends formed into foot pieces and prop means for the opposite end portion of said plank embodying a pair of substantially duplicate links hingedly connected at their lower ends to the horizontal baseboard and pivotally connected at their upper ends to said plank.

5. A portable and foldable vehicle ramp construction of the class shown and described comprising a horizontally disposable baseboard adapted to rest on a fixed supporting surface, a plank, constituting a ramp, provided at one end with latch means operatively and separably connectible to the corresponding end of said baseboard, a pair of opposed links pivotally and foldably connecting the opposite end portions of the baseboard and plank, a U-shaped yoke embodying slotted arms, said yoke straddling the last named end portion of said plank and the slotted arms being slidably and hingedly connected to said plank, said yoke being projectable and retractable in respect to said plank and constituting a wheel stop, a second U-shaped yoke also straddling said plank with its bight portion spanning the traction surface of the plank at a point adjacent the first-named yoke, the limbs of last-named yoke being hingedly connected to edge portions of said plank, the free ends of the limbs of the second named yoke being hingedly connected to the slotted limbs of the first-named yoke, said second named yoke constituting a wheel actuated trip and serving to bring the wheel stop yoke automatically into play.

LLOYD A. LARSON.

REFERENCES CITED

The following references are of record in the file of this patent:

UNITED STATES PATENTS

| Number | Name | Date |
|---|---|---|
| 1,922,552 | McCosh | Aug. 15, 1933 |
| 2,053,646 | Whalen | Sept. 8, 1936 |
| 2,166,477 | Polk et al. | July 18, 1939 |
| 2,237,620 | Doughty et al. | Apr. 8, 1941 |